(12) United States Patent
Livesay et al.

(10) Patent No.: US 6,619,883 B2
(45) Date of Patent: Sep. 16, 2003

(54) COMPACTOR TOOTH (75) Inventors: Richard E. Livesay, Peoria, IL (US); Riaz A. Shaikh, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/995,495

(22) Filed: Nov. 27, 2001

(65) Prior Publication Data

US 2003/0099513 A1 May 29, 2003

(51) Int. Cl.[7] .............................................. E01C 19/26
(52) U.S. Cl. ...................... 404/124; 404/121; 37/452; 37/455; 37/453
(58) Field of Search ................................ 404/121, 122, 404/124, 128; 37/452, 454, 456, 453

(56) References Cited

U.S. PATENT DOCUMENTS

| 3,822,957 A | 7/1974 | Caron et al. |
| 4,066,375 A | 1/1978 | Caron et al. |
| 4,668,122 A | 5/1987 | Riddle |
| 4,919,566 A | 4/1990 | Caron et al. |
| H946 H | 8/1991 | Lonn |
| 5,217,321 A | 6/1993 | Corcoran et al. |
| 5,217,322 A | 6/1993 | Corcoran et al. |
| 5,909,962 A * | 6/1999 | Livesay et al. ............... 37/456 |
| 2002/0048489 A1 * | 4/2002 | Caron et al. |

FOREIGN PATENT DOCUMENTS

| EP | 0172019 | * | 8/1985 | ........... E02D/3/026 |

* cited by examiner

*Primary Examiner*—Thomas B. Will
*Assistant Examiner*—Alexandra K. Pechhold
(74) *Attorney, Agent, or Firm*—O Gordon Pence; Jeff A Greene (57) ABSTRACT

A compactor tooth has a replaceable wear tip mounted to a mounting block carried on the cylindrical exterior surface of a landfill-compactor wheel of a compactor machine. The mounting block has an external surface formed to engage a complementary internal cavity of the wear tip and includes a pair of circumferentially-spaced sides oriented not more than 5 degrees from perpendicular to the cylindrical exterior surface of the wheel. The replaceable tip has a body with an exterior ground-engaging surface, a mounting end and a mounting-base receiving cavity opening through the mounting end. The cavity is configured to receive the mounting block thereinto and has a pair of circumferentially-spaced side surfaces configured to be in close abutting relationship to a respective one of the circumferentially-spaced sides of the mounting block.

17 Claims, 6 Drawing Sheets

COMPACTOR TOOTH

TECHNICAL FIELD

This invention relates in general to a compactor tooth for use on a compactor wheel and, more particularly, to a compactor tooth having a replaceable wear tip that is mechanically attached to a mounting block carried on the drum of the compactor wheel.

BACKGROUND

A compactor is a type of self-propelled work machine used at construction sites to compact fill dirt and at landfills to crush and compact waste and refuse materials. In landfill applications, the compaction of such materials reduces the size and bulk of the materials, which are then covered by a layer of soil. Compactors have wheels with large steel drums or rollers. The cylindrical exterior surfaces of such drums are commonly ringed with a large number of teeth to increase the compaction and crushing capability of the compactor. As such teeth are subject to wear, it is desirable to construct such teeth with replaceable tips or wear members, which are detachable mounted to an adapter or mounting block that is welded to the compactor wheel drum. In the past, steel pins and other types of retaining devices have been employed to detachably secure the tips to the mounting blocks. Statutory Invention Registration No. H946 for Tip And Adaptor Assembly, published Aug. 6, 1991 to Alan H. Lonn, discloses a replaceable tip that is pinned to an adapter by the insertion of a pin through aligned apertures in both components. Such pins, however, have been subject to frequent breakage due to loads being exerted on the retaining pin during operation of the compactor. Such pin breakage results in the loss of the tip and damage to the adapter.

It is therefore desirable to provide a compactor tooth that is not subject to failure of the retainer and to provide an improved compactor tooth that overcomes one or more of the problems associated with the above.

SUMMARY OF THE INVENTION

In one aspect of the present invention, a compactor tooth is disclosed for use on the cylindrical exterior surface of a landfill-compactor wheel. The compactor tooth includes a replaceable tip and a mounting block. The mounting block is secured to the cylindrical exterior surface of the wheel and has a mounting surface contacting the cylindrical exterior surface, a top surface remote from the cylindrical exterior surface, a pair of circumferentially-spaced sides, and a pair of axially-spaced sides. The circumferentially-spaced sides are oriented not more than 5 degrees from perpendicular to the cylindrical exterior surface of the wheel. The replaceable tip has a body with an exterior ground-engaging surface, a mounting end and a mounting block receiving cavity opening through the mounting end. The cavity is configured to receive the mounting block thereinto and has a bottom surface disposed for abutting engagement with the top surface of the mounting block. The cavity also includes a pair of circumferentially-spaced side surfaces and a pair of axially-spaced side surfaces. The circumferentially-spaced side surfaces are configured to be in close abutting relationship to a respective one of the circumferentially-spaced sides of the mounting block.

DETAILED DESCRIPTION

Figure 1:
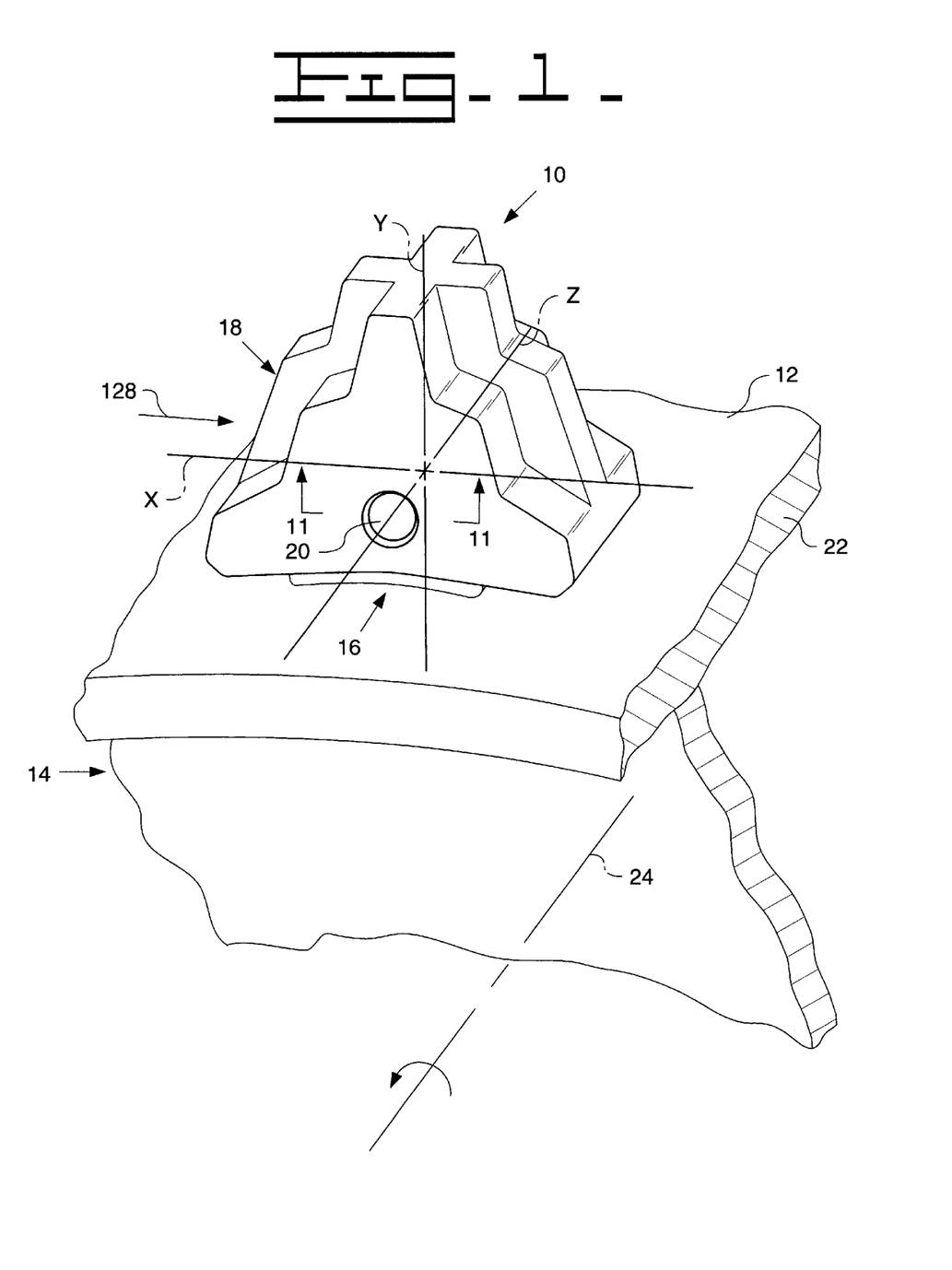
FIG. 1 is a diagrammatic perspective view of a portion of a compactor wheel illustrating one of the compactor teeth of the present invention mounted on such wheel.

Referring now to FIG. 1, there is illustrated an assembled compactor tooth 10 for use on a landfill-compactor wheel 14 of a compactor work machine (not shown). While only one such tooth 10 is shown, it should be understood that a large number of such teeth 10 are distributed about the cylindrical exterior surface 12 of the compactor wheel 14. Each compactor tooth 10 includes a mounting block 16 and a replaceable wear tip 18, which is selectively retained on the mounting block by a retainer generally shown at 20. The cylindrical exterior surface 12 is that of a steel drum 22 that is typically used for compactor wheels of compactors, or machines employed for compacting earth in road-building or other types of construction, or for compacting refuse in landfills or the like. The cylindrical exterior surface 12 of the drum 22 is disposed about a central axis 24 of the wheel 14. For directional orientation purposes herein, the tooth 10 in FIG. 1 is shown with 'x', 'y' and 'z' axii, with the 'x' axis extending in a direction which is generally tangential to the circumference of the cylindrical exterior surface 12 of the wheel, the 'y' axis extending in a direction which is generally perpendicular to the central axis 24 of the wheel 14, and the 'z' axis extending in a direction which is generally parallel to the central axis 24. Accordingly, a reference to an axial direction herein means in a direction generally parallel to the 'z' axis, a reference to a circumferential direction means in a direction generally parallel to the 'x' axis, and a reference to a radial direction means in a direction generally parallel to the 'y' axis.

Figure 2:
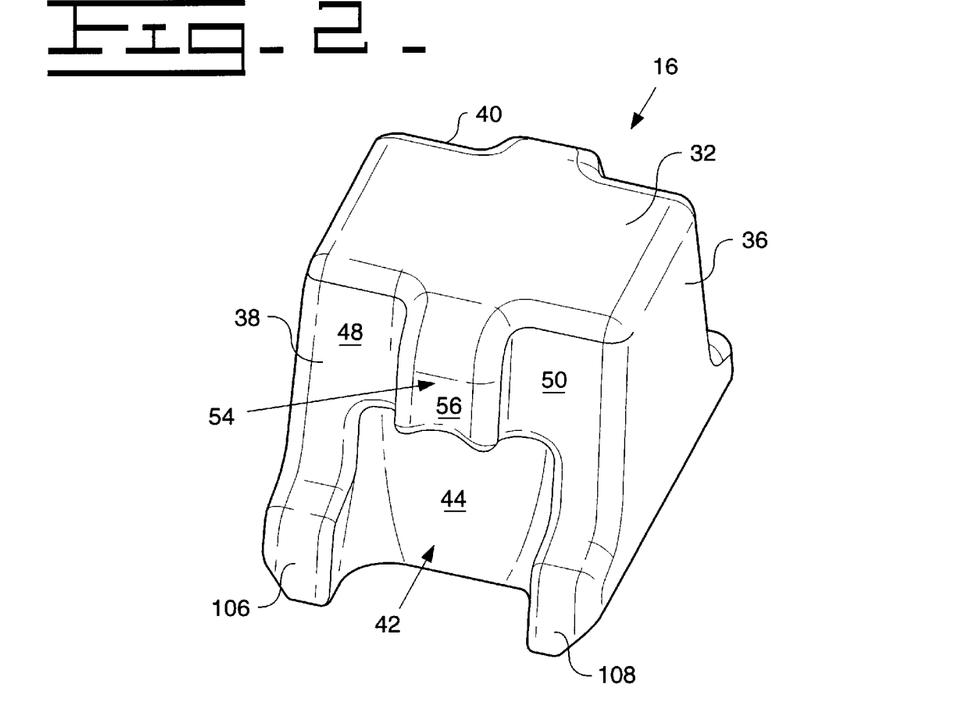
FIG. 2 is an enlarged perspective view of the mounting block of the compactor tooth of FIG. 1.
Figure 3:
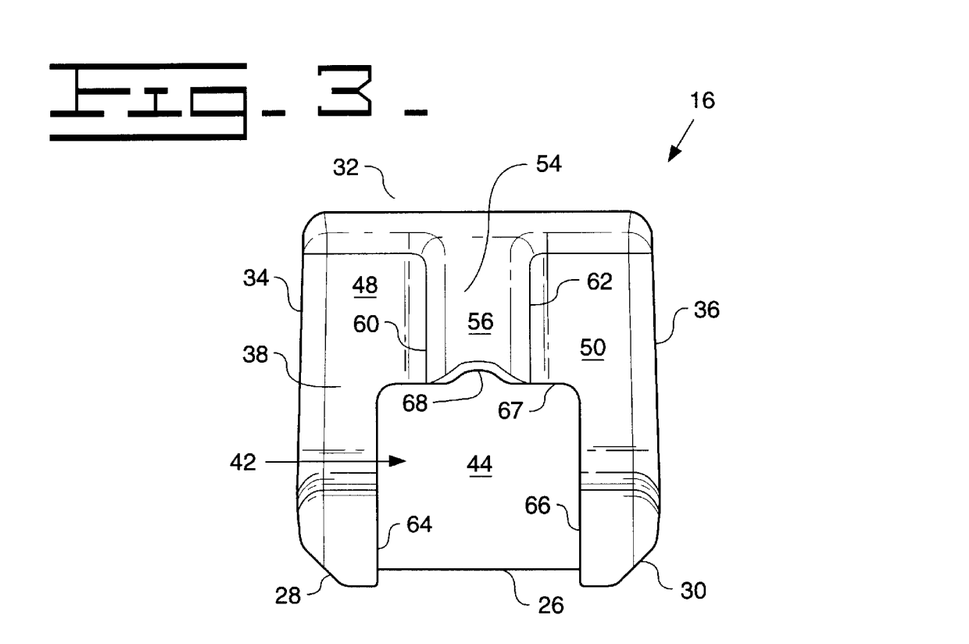
FIG. 3 is a side planar view of the mounting block illustrated in FIG. 2.
Figure 4:
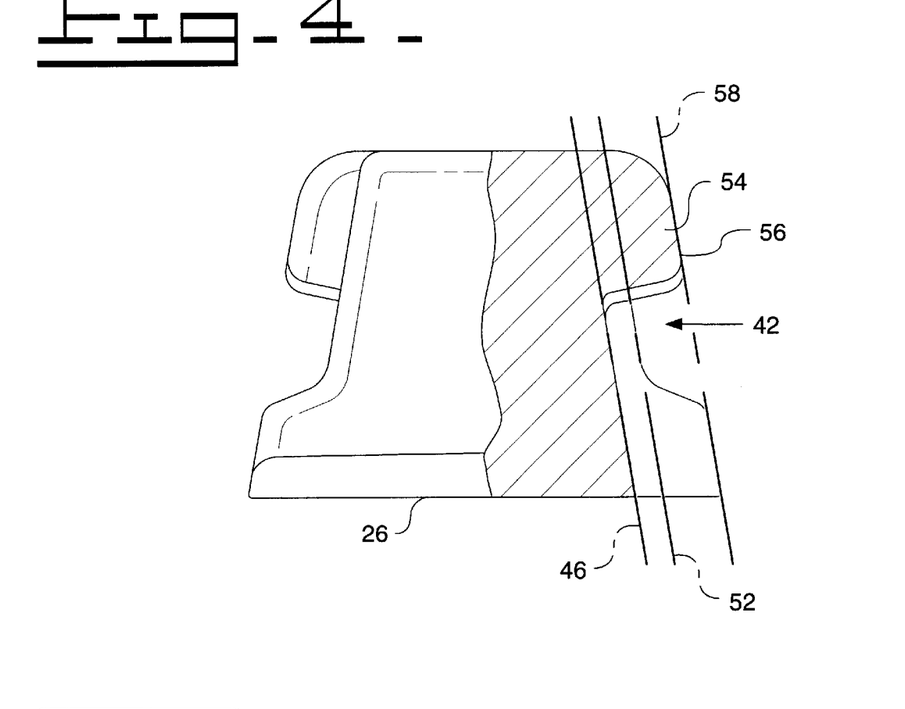
FIG. 4 is a front planar view of the mounting block of FIG. 2, with a portion shown in section.

As depicted in FIGS. 2–4, the mounting block 16 has an arcuate mounting surface 26 for mating contact with cylindrical exterior surface 12 of the compactor wheel 14. The mounting block 16 is preferably secured to the cylindrical exterior surface 12 of the wheel 14 by welding along chamfered edge surfaces at 28,30. The mounting block 16 has a top surface 32 remote from the cylindrical exterior surface 12, a pair of circumferentially-spaced sides 34,36, and a pair of axially-spaced sides 38,40. For purposes hereinafter described, the circumferentially-spaced sides 34,36 are planar and are constructed to extend in a radial direction so as to be oriented at an angle of not more than 5 degrees from perpendicular to the cylindrical exterior surface 12 of the wheel 14.

In one preferred embodiment, at least one of the axially-spaced sides 38 of the mounting block 16 has a retainer pocket 42 formed therein having an inward or bottom surface 44 lying along a first plane 46. Such one side 38 further has a pair of edge surfaces 48,50 on opposite sides of the retainer pocket 42 and lying along a second-intermediate plane 52 spaced outboard of the first plane 46.

A generally radially oriented tongue portion 54 has an outer surface 56 disposed along a third-outer plane 58 spaced outboard of the second plane 52. The tongue portion 54 has a pair of opposite circumferentially spaced sides 60,62 spaced a predetermined distance apart. The retainer pocket 42 has a pair of opposed circumferentially spaced sides 64,66 and a transverse top surface 67 extending therebetween and adjacent the tongue portion 54. The retainer pocket sides 64,66 are spaced apart at a distance greater than the predetermined distance between the sides 60,62 so that each is disposed outboard of its respective one of the sides 60,62 of the tongue portion 54. The tongue portion 54 is disposed adjacent the retainer pocket 42 and has a concave surface 68 generally facing the cylindrical exterior surface 12 of the wheel 14. Concave surface 68 extends along the tongue portion 54 and into the top surface 67 of the retainer pocket 42. Preferably, the opposite side 40 of the mounting block 16 is configured as described above for the one side 38.

Figure 5:
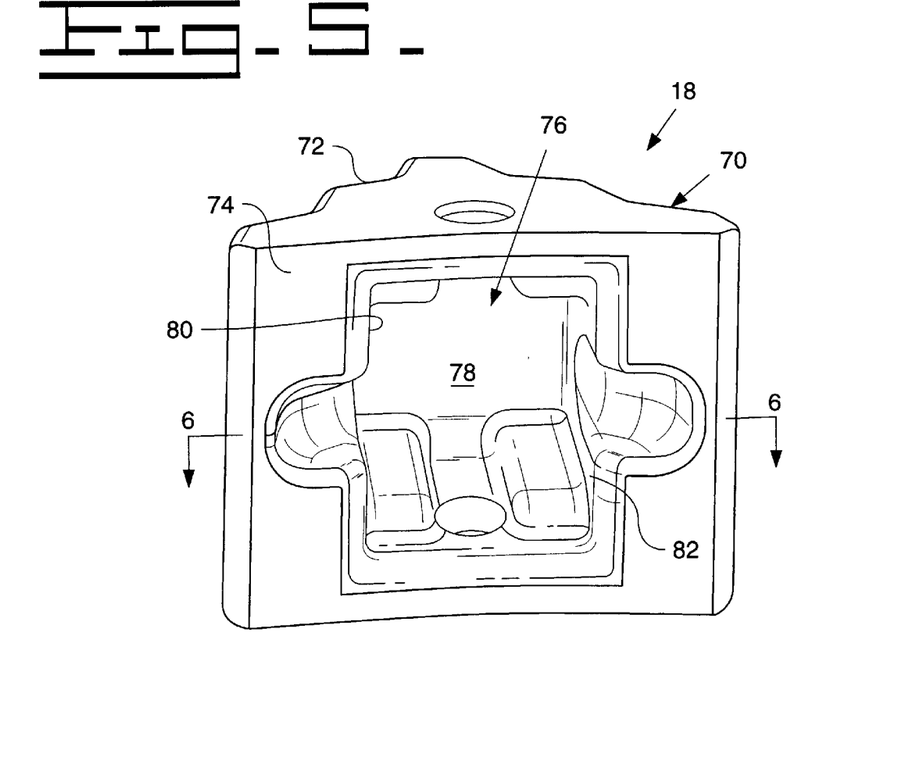
FIG. 5 is a bottom perspective view of the tip of the tooth illustrated in FIG. 1.
Figure 6:
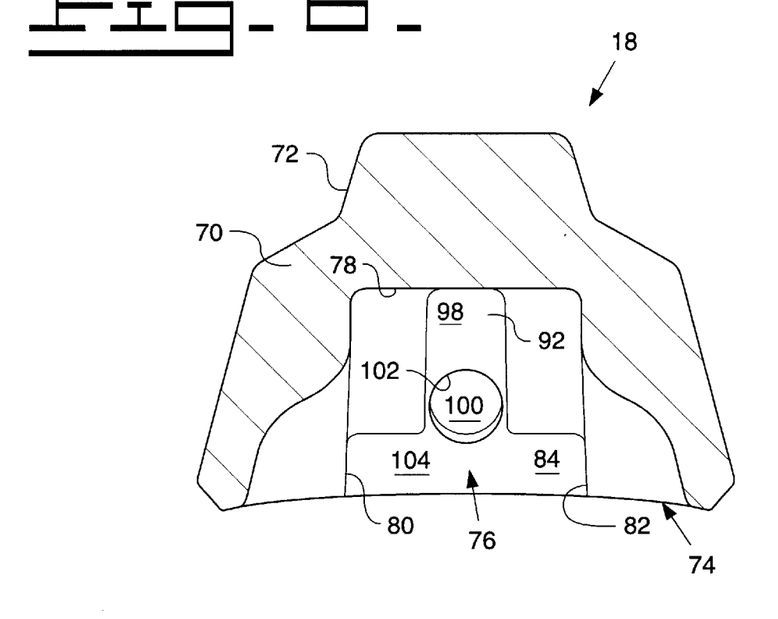
FIG. 6 is a side cross-sectional view of the tip taken generally along line 6—6 in FIG. 5.
Figure 7:
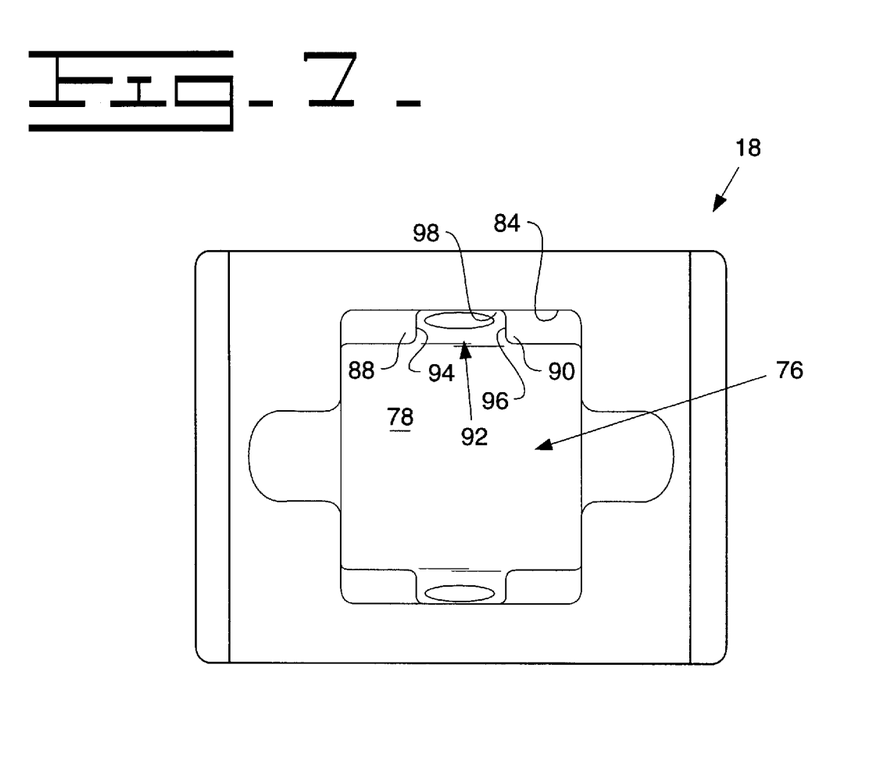
FIG. 7 is a bottom planar view of the tip.

As best depicted in FIGS. 5–7, the replaceable tip 18 has a body 70 with an exterior ground-engaging surface 72, a mounting end 74 and a mounting block receiving cavity 76 opening through the mounting end 74. The exterior ground-engaging surface 72 preferably has stepped "plus"-symbol profile to better crush and compact the materials it engages when a compactor wheel moves across waste material or fill dirt. The portions of the "plus" shape that are aligned parallel to the direction of travel of the compactor wheel provide a crushing, grinding and compacting force on the material being compacted, while the portions of the "plus" shape that are transverse to the direction of travel of the wheel provides the traction of the wheel on the refuse material and/or soil being worked. It should be understood that wheel 14 is a drive wheel which is driven by the compactor. Therefore, substantial rim-pull forces are transferred from the wheel 14 into the ground through the transverse portions of the teeth 10, such rim pull forces being oriented in the direction of arrow 128 relative to the wheel 14. While the exterior ground-engaging surface 72 is illustrated in a "plus" configuration, it is to be understood that the profile of the exterior ground-engaging surface 72 of the tip 18 may be formed in a number of other configurations as well.

The cavity 76 of the tip 18 is configured to receive the mounting block 16 and has an upper surface 78 disposed for radial load transferring abutting engagement with the top surface 32 of the mounting block 16. The cavity 76 also has sidewalls defining a pair of circumferentially-spaced side surfaces 80,82 and a pair of axially-spaced side surfaces 84,86. The circumferentially-spaced side surfaces 80,82 are configured to be in close abutting relationship to a respective one of the circumferentially-spaced sides 34,36 of the mounting block 16 for transferring the rim pull forces generated by the compactor.

At least one of the axially-spaced side surfaces 84 of the cavity 76 of the tip 18 includes a pair of circumferentially spaced apart ribs 88,90 defining a generally radially oriented groove 92 therebetween and which provides a pair of opposed side surfaces 94,96 and a transverse surface 98. The groove 92 is adapted to receive the tongue portion 54 on the mounting block 16. The transverse surface 98 is positionable in a close abutting relationship to the outer surface 56 of the tongue portion 54, while the ribs 88,90 are received along their respective edge surfaces 48,50, when the tip 18 is mounted on the mounting block 16. Upon such mounting, the opposed side surfaces 94,96 of the ribs 88,90 are also disposed in close abutting relationship to a respective one of spaced sides 60,62 of the tongue portion 54. The sidewall of the cavity 76 with the one axially-spaced side surface 84 further includes an annular through-hole 100 located within the groove 92 and alignable with the retainer pocket 42 in the mounting block 16. The through-hole 100 is provided with an arcuate side surface portion 102 in general alignment with the concave surface 68 on the tongue portion 54, the purpose of which will become subsequently apparent. Such one side surface 84 also has a lower surface 104 disposed along the mounting end 74, which is in close abutting relation to a pair of axially extending feet 106,108 on the mounting block 16 and employed to transfer axial or side loads between the mounting block 16 and the tip 18.

Preferably, the opposite side surface 86 of the tip 18 is configured as described above for the one side 84.

Figure 8:
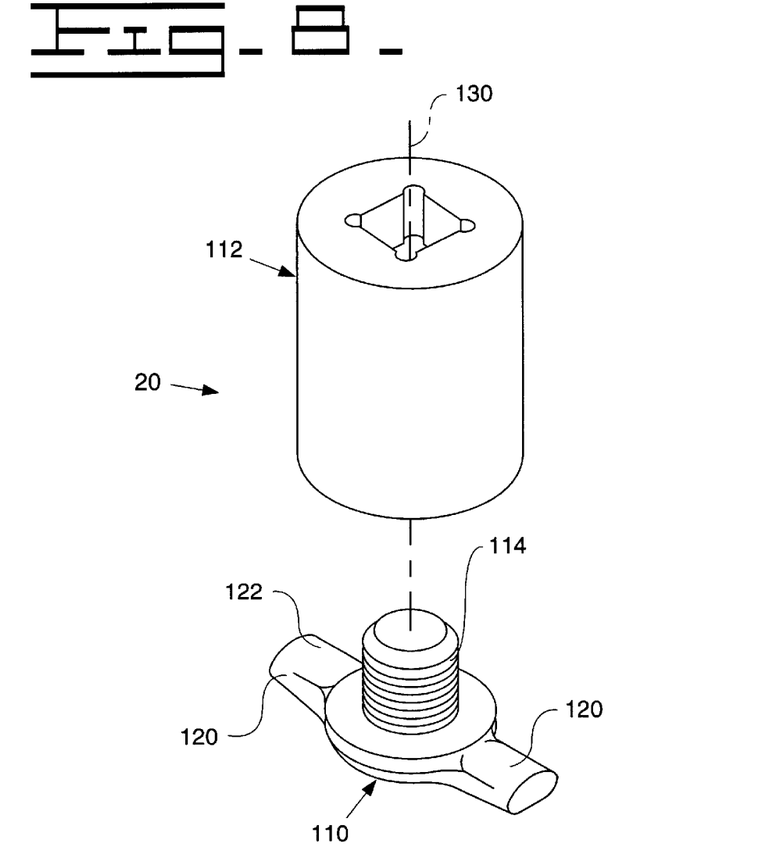
FIG. 8 is an exploded perspective view of the retainer of the present invention.
Figure 9:
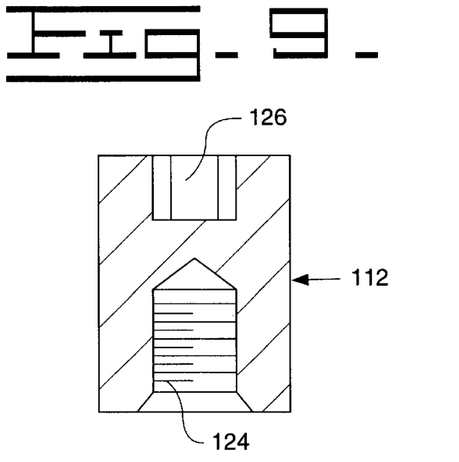
FIG. 9 is a cross-sectional view of the barrel member of the retainer shown in FIG. 8.
Figure 10:
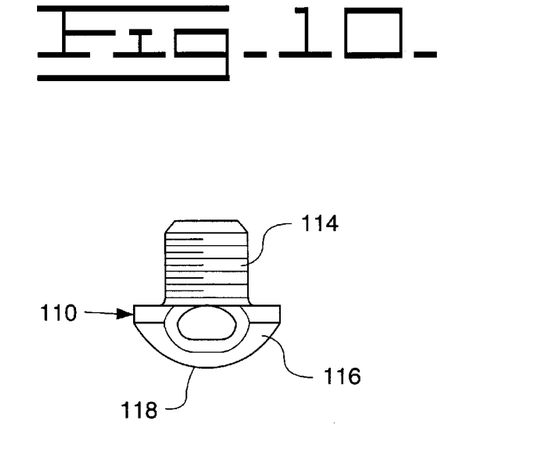
FIG. 10 is a side elevational view of the anchor member of the retainer shown in FIG. 8.

Turning now to the retainer 20, as best shown in FIGS. 8–10, such retainer 20 is used for detachable retaining the tip 18 to the mounting block 16. In one embodiment, retainer 20 includes an anchor member 110 and a barrel member 112. The anchor member 110 is provided with a threaded stud portion 114 and includes a base portion 116 having a spherically shaped bottom surface 118 thereon and a pair of radially extending arms 120 extending therefrom. The arms 120 have an arcuately shaped upper surface 122 thereon.

The barrel member 112 is preferably cylindrical in shape and of a predetermined diameter. The barrel member 112 is disposed along a central axis 130 and has a threaded bore 124 in one end thereof and a tool socket 126 in the other end thereof, and is adapted to be threadably engageable with the stud portion 114 of the anchor member 110.

Figure 11:
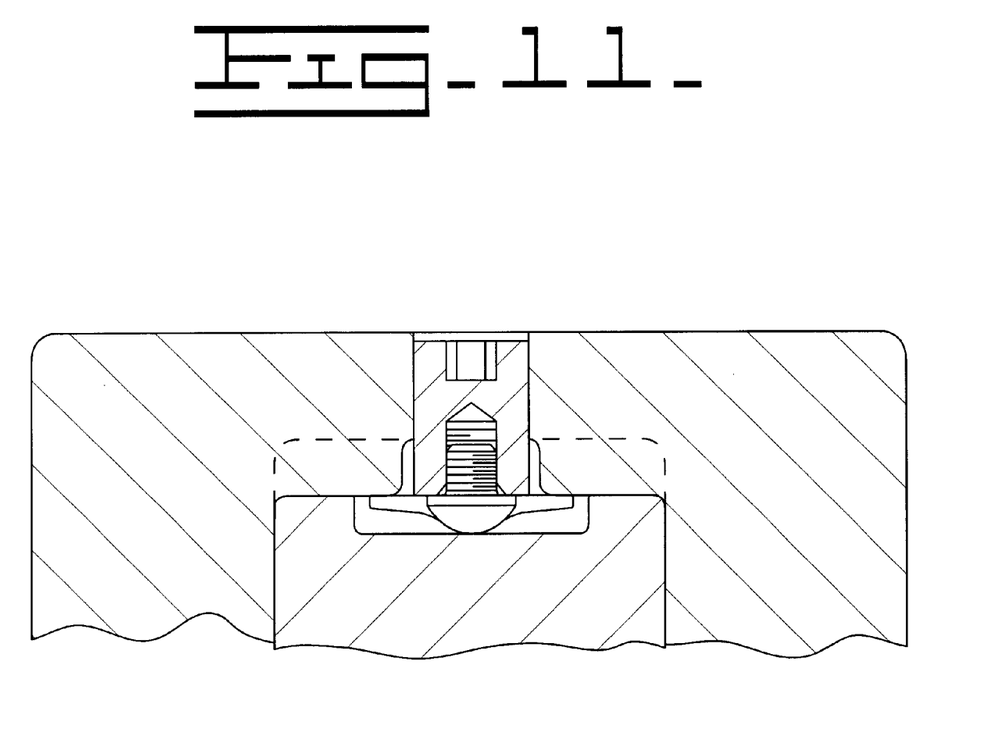
FIG. 11 is a partial cross-sectional view of the tooth taken along line 11—11 of FIG. 1.

The anchor member 110 is adapted for receipt into the retainer pocket 42 of the mounting block 16 and to engage one of the tip 18 or the mounting block 16 to prevent the rotation of the anchor member 110 upon the application of a torquing or tightening force thereto by means of a suitable tool which is placed in the tool socket 126. When the tip 18 is placed onto the mounting block 16, the arms 120 extend under a respective one of the ribs 88,90 of the tip 18 so as to be captured thereby in order to locate and maintain the retainer 20 in place. Once the tip 18 is mounted, the barrel member 112 is inserted into the through-hole 100 of the side surface 84 of the cavity 76 of the tip and screwed onto the threaded stud portion 114 of the anchor member 110. The predetermined diameter of the barrel member 112 is selected for close receipt of the barrel member 112 in the through-hole 100.

The arcuately shaped upper surfaces 122 on the arms 120 also facilitate the rocking or tilting of the retainer 20 for alignment purposes and for reducing bending forces on the retainer 20. The main function of the arms 120 is to prevent the anchor member 110 from rotating so that the barrel member 112 can be threaded onto the stud portion 114 and a sufficient torque applied thereto to securely tighten the barrel member 112 onto the anchor member 110 and, conversely, to untighten the barrel member 112 from the anchor member 110. The prevention of rotation of the anchor member 110 is accomplished by the engagement of the arms 120 with the top surface 67 of the retainer pocket 42.

Once assembled, the construction of the tooth 10 and its components allows the anchor member 110 to be loosely seated in the retainer pocket 42. The round bottom 118 and arcuate upper surfaces 122 of the arms 120 allow the retainer 20 to easily tilt for alignment purposes with the hole 100 in the side of the tip 18 and to reduce bending forces on the retainer 20. The tip 18 is retained on the mounting block 16 through engagement of the barrel member 112 of the retainer 20 with the hole 100 in the tip 18 and with the concave surface 68 of the tongue portion 54 of the mounting block 16. While not essential, it is preferable to employ two of the retainers 20 in retaining the tip 18, one in either side of tooth 10.

INDUSTRIAL APPLICABILITY

The construction of prior compactor teeth enabled rim pull forces acting on the teeth to be exerted on the retaining pins, causing such pins to break. One of the reasons for this is that the primary load transmitting surface employed on the replaceable tip of prior designs and the mating load carrying surface on the mounting base of such teeth are disposed at too great of an angle relative to the direction of the rim pull forces acting on the tooth. As a consequence, a component of the rim pull force acting in an upward radial direction is created. This radial component force tends to rotate the tip about and lift the tip away from its mounting base. In addition, the opposite lower edge of such prior tips contact the compactor wheel when such rim forces are applied. This creates a pivot point about which the tip rotates relative to the mounting base. Due to the distance from this pivot point and pin, the amount of radial movement of the tip at the pin is increased. As the pin is situated to prevent such radial movement, a high resultant force is thereby applied to the pin, which frequently overloads the pin, causing it to break.

The compactor tooth 10 of the present invention has a construction especially adapted for transferring rim pull forces exerted on the tip 18 into the mounting block 16 in a manner so as to isolate the transmission of such forces from the retainer 20, thus reducing the breakage of such retainer. In addition, the construction of the present retainer 20 and its containment in the tooth maximizes its load carrying capabilities, while at the same time relieving such retainer from experiencing the high loads exerted on the pins of prior compactor teeth devices.

The benefits mentioned above are accomplished by various features of the present compactor tooth 10. In particular, the circumferentially-spaced sides 34,36 of the mounting block 16 and the corresponding circumferentially-spaced sides 80,82 of the tip 18 provide the primary load transferring surfaces for transferring rim pull forces between the tip 18 and mounting block 16. Such surfaces are oriented substantially perpendicular to such rim pull forces acting in the direction of arrow 128. As a consequence, minimal radial components of force are created, thereby reduces the tendency of the tip 18 to pivot relative to the mounting block 16. Also, the mounting end 74 of the tip 18 is constructed so as not to contact the cylindrical exterior surface 12 of the wheel 14 when the tip 18 is mounted upon the mounting block 16. This prevents the edge of the tip 18 from acting as a fulcrum that is located at the greatest distance possible from the retainer 20. In the present structure, such fulcrum is located, if at all, along one of the circumferentially spaced side surfaces 34,36, which are much closer to the retainer 20. Thus, and resulting pivotal movement of the tip at the retainer 20 is reduced as compared to prior compactor teeth.

Retainer breakage is also reduced by the fact that the only loads exerted on the retainer 20 are exerted solely on the barrel member 112 through the concave surface 68 on one side and the opposing arcuate side surface of the hole 100 on the other side of the barrel member. The construction of the retainer 20, such as the spherically shaped bottom surface 118 and the arcuately shaped upper surface 122 on the anchor member 110, means that the retainer 20 is relatively unrestrained. This allows the retainer 20 to easily pivot and move in order to align itself with the hole 100. Thus, any undue bending forces are eliminated.

While this invention is described and shown for use with a compactor, it is to be understood that the present invention could be readily adapted use in other applications, such as for the juncture between a bucket tooth and adapter. This invention has been described in the specification and illustrated in the drawings with reference to a preferred embodiment, the structure of which has been disclosed herein. However, it will also be understood by those skilled in the art to which this invention pertains that various changes or modifications may be made and equivalents may be substituted for elements of the invention without departing from the scope of the claims. Therefore, it is intended that the invention not be limited to the particular embodiment disclosed in the specification and shown in the drawings as the best mode presently known by the inventors for carrying out this invention, nor confined to the details set forth in the preferred embodiment, but that the invention shall include all embodiments, modifications and changes as may come within the scope of the following claims.

What is claimed is:

1. A compactor tooth for use on a cylindrical exterior surface of a landfill-compactor wheel, said compactor tooth comprising:

a mounting block adapted to be secured to the cylindrical exterior surface of said wheel and having a mounting surface configured for mating contact with said cylindrical exterior surface, a top surface remote from said cylindrical exterior surface, a pair of circumferentially-spaced sides, and a pair of axially-spaced sides, a tongue portion and a retainer pocket formed on at least one of said axially-spaced sides, said retainer pocket and extending from a location adjacent said mounting surface to a location adjacent said tongue portion; and a replaceable tip having a body with an exterior ground-engaging surface, a mounting end and a mounting-base receiving cavity opening through said mounting end, said cavity being configured to receive said mounting block thereinto and having a bottom surface disposed for abutting engagement with said top surface of said mounting block, a pair of circumferentially-spaced side surfaces and a pair of axially-spaced side surfaces, said circumferentially-spaced side surfaces being oriented and configured to be in close abutting relationship to a respective one of said circumferentially-spaced sides of said mounting block.

2. The compactor tooth of claim 1 wherein said mounting end of said tip is constructed so as not to contact the cylindrical exterior surface of said wheel when said tip is mounted upon said mounting block.

3. The compactor tooth of claim 2 wherein said retainer pocket has a bottom surface lying along a first plane, said at least one side further having a pair of edge surfaces on opposite sides of said retainer pocket and lying along a second-intermediate plane spaced outboard of said first plane, and said tongue portion having an outer surface disposed along a third-outer plane spaced outboard of said second plane.

4. The compactor tooth of claim 3 wherein said tongue portion is disposed adjacent said retainer pocket and wherein a concave surface generally facing said cylindrical exterior surface of said wheel extends along said tongue portion and into said retainer pocket.

5. The compactor tooth of claim 4 wherein at least one of said axially-spaced side surfaces of said cavity of the tip includes a pair of circumferentially spaced apart ribs defining a generally radially oriented groove therebetween with a pair of opposed side surfaces and a transverse surface, said transverse surface being positionable in close abutting relation to said outer surface of said tongue portion.

6. The compactor tooth of claim 5 wherein said tip further includes an annular through-hole located within said groove and alignable with said retainer pocket in said mounting block and with said concave surface on said tongue portion.

7. The compactor tooth of claim 6 wherein said tongue portion has a pair of opposite circumferentially spaced sides spaced a predetermined distance apart and wherein said retainer pocket has a pair of opposed circumferentially spaced sides, each of said retainer pocket sides being spaced apart at a distance greater than said predetermined distance so as to be disposed outboard of a respective one of said sides of said tongue portion, and wherein said opposed side surfaces of said ribs are disposed in close abutting relationship to a respective one of spaced sides of said tongue portion.

8. The compactor tooth of claim 1 including a retainer for selectively retaining said tip to said mounting block.

9. The compactor tooth of claim 8 wherein said retainer includes an anchor member adapted for engagement with one of said tip or said mounting block to prevent the rotation of said anchor member upon the application of an anchor force thereto.

10. The compactor tooth of claim 9 wherein said anchor member includes a threaded stud portion and wherein said retainer includes a barrel member having a threaded bore in one end thereof and a tool socket in the other end thereof, and said barrel member is adapted to be threadably engageable with said stud portion of said anchor member.

11. The compactor tooth of claim 10 wherein said anchor member includes a base portion having a spherically shaped surface thereon and a pair of radially extending arms, said arms having an arcuately shaped upper surface thereon.

12. A compactor tooth for use on a cylindrical exterior surface of a landfill-compactor wheel, said compactor tooth comprising:

a mounting block adapted to be secured to the cylindrical exterior surface of said wheel and having a mounting surface configured for mating contact with said cylindrical exterior surface, a top surface remote from said cylindrical exterior surface, a pair of circumferentially-spaced sides, and a pair of axially-spaced sides, said circumferentially-spaced sides being oriented not more than 5 degrees from perpendicular to said cylindrical exterior surface of said wheel;

a replaceable tip having a body with an exterior ground-engaging surface, a mounting end and a mounting-base receiving cavity opening through said mounting end, said cavity being configured to receive said mounting block thereinto and having a bottom surface disposed for abutting engagement with said top surface of said mounting block, a pair of circumferentially-spaced side surfaces and a pair of axially-spaced side surfaces, said circumferentially-spaced side surfaces being oriented and configured to be in close abutting relationship to a respective one of said circumferentially-spaced sides of said mounting block; and wherein at least one of said axially-spaced sides of said mounting block has a retainer pocket formed therein and having a bottom surface lying along a first plane, said at least one side further having a pair of edge surfaces on opposite sides of said retainer pocket and lying along a second-intermediate plane spaced outboard of said first plane, and a generally radially oriented tongue portion having an outer surface disposed along a third-outer plane spaced outboard of said second plane.

13. The compactor tooth of claim 12 wherein said tongue portion is disposed adjacent said retainer pocket and wherein a concave surface generally facing said cylindrical exterior surface of said wheel extends along said tongue portion and into said retainer pocket.

14. The compactor tooth of claim 13 wherein at least one of said axially-spaced side surfaces of said cavity of the tip includes a pair of circumferentially spaced apart ribs defining a generally radially oriented groove therebetween with a pair of opposed side surfaces and a transverse surface, said transverse surface being positionable in close abutting relation to said outer surface of said tongue portion.

15. The compactor tooth of claim 14 wherein said tip further includes an annular through-hole located within said groove and alignable with said retainer pocket in said mounting block and with said concave surface on said tongue portion.

16. The compactor tooth of claim 15 wherein said tongue portion has a pair of opposite circumferentially spaced sides spaced a predetermined distance apart and wherein said retainer pocket has a pair of opposed circumferentially spaced sides, each of said retainer pocket sides being spaced apart at a distance greater than said predetermined distance so as to be disposed outboard of a respective one of said sides of said tongue portion, and wherein said opposed side surfaces of said ribs are disposed in close abutting relationship to a respective one of spaced sides of said tongue portion.

17. A compactor tooth for use on a cylindrical exterior surface of a landfill-compactor wheel, said compactor tooth comprising:

a mounting block adapted to be secured to the cylindrical exterior surface of said wheel and having a mounting surface configured for mating contact with said cylindrical exterior surface, a top surface remote from said cylindrical exterior surface, a pair of circumferentially-spaced sides, and a pair of axially-spaced sides, said circumferentially-spaced sides being oriented not more than 5 degrees from perpendicular to said cylindrical exterior surface of said wheel;

a replaceable tip having a body with an exterior ground-engaging surface, a mounting end and a mounting-base receiving cavity opening through said mounting end, said cavity being configured to receive said mounting block thereinto and having a bottom surface disposed for abutting engagement with said top surface of said mounting block, a pair of circumferentially-spaced side surfaces and a pair of axially-spaced side surfaces, said circumferentially-spaced side surfaces being oriented and configured to be in close abutting relationship to a respective one of said circumferentially-spaced sides of said mounting block;

a retainer for selectively retaining said tip to said mounting block;

wherein said retainer includes an anchor member adapted for engagement with one of said tip or said mounting block to prevent the rotation of said anchor member upon the application of an anchor force thereto;

wherein said anchor member includes a threaded stud portion and wherein said retainer includes a barrel member having a threaded bore in one end thereof and a tool socket in the other end thereof, and said barrel member is adapted to be threadably engageable with said stud portion of said anchor member; and wherein said anchor member includes a base portion having a spherically shaped surface thereon and a pair of radially extending arms, said arms having an arcuately shaped upper surface thereon.

* * * * *